United States Patent [19]
Gerhardt

[11] Patent Number: 5,916,335
[45] Date of Patent: *Jun. 29, 1999

[54] PROCESS FOR THE MACHINING OF STAMPING PARTS PHOTOCHEMICALLY ETCHED OUT OF A CARRIER BASE, AND STAMPING WEBS OBTAINED THEREFROM

[75] Inventor: Joergen Gerhardt, Dragoer, Denmark

[73] Assignee: Gerhardt International A/S, Kastrup, Denmark

[*] Notice: This patent issued on a continued prosecution application filed under 37 CFR 1.53(d), and is subject to the twenty year patent term provisions of 35 U.S.C. 154(a)(2).

[21] Appl. No.: 08/621,492

[22] Filed: Mar. 25, 1996

Related U.S. Application Data

[62] Division of application No. 08/261,128, Jun. 14, 1994, abandoned.

[30] Foreign Application Priority Data

Jan. 4, 1994 [DE] Germany .............................. 44 00 106

[51] Int. Cl.$^6$ .................................................... B21K 5/20
[52] U.S. Cl. ............................................ 76/107.1; 83/663
[58] Field of Search ................................ 76/107.1, 101.1; 83/343, 345–346, 663, 669

[56] References Cited

U.S. PATENT DOCUMENTS

| | | | |
|---|---|---|---|
| 2,349,336 | 5/1944 | Batchelder | 164/70 |
| 3,618,438 | 11/1971 | Simson | 83/117 |
| 3,758,350 | 9/1973 | Weglin | 156/650 |
| 3,789,715 | 2/1974 | Schuchardt et al. | 30/663 |
| 3,850,059 | 11/1974 | Kang | 83/7 |
| 4,625,592 | 12/1986 | Bayens | 76/107 C |
| 4,966,054 | 10/1990 | Beck | 76/4 |

FOREIGN PATENT DOCUMENTS

| | | |
|---|---|---|
| 0 321 590 | 6/1989 | European Pat. Off. . |
| 203993 | 9/1923 | United Kingdom . |
| 2 066 162 | 7/1981 | United Kingdom . |
| 2 252 743 | 8/1992 | United Kingdom . |

*Primary Examiner*—Douglas D. Watts
*Attorney, Agent, or Firm*—Foley & Lardner

[57] ABSTRACT

The invention relates to the machining of cutting (stamping) edges which are etched photochemically out of a carrier base and by means of which labels consisting of label material adhering releasably to a supporting web are to be cut (stamped) as a result of the rolling of the cutting edges of the label material, wherein the cutting edges are given a triangular cross-section having fluted sides by milling by means of a frustoconical milling cutter engaging the longitudinal sides of the cutting edges and rotating about its axis. The invention also relates to cutting edges obtained by the process.

8 Claims, 6 Drawing Sheets

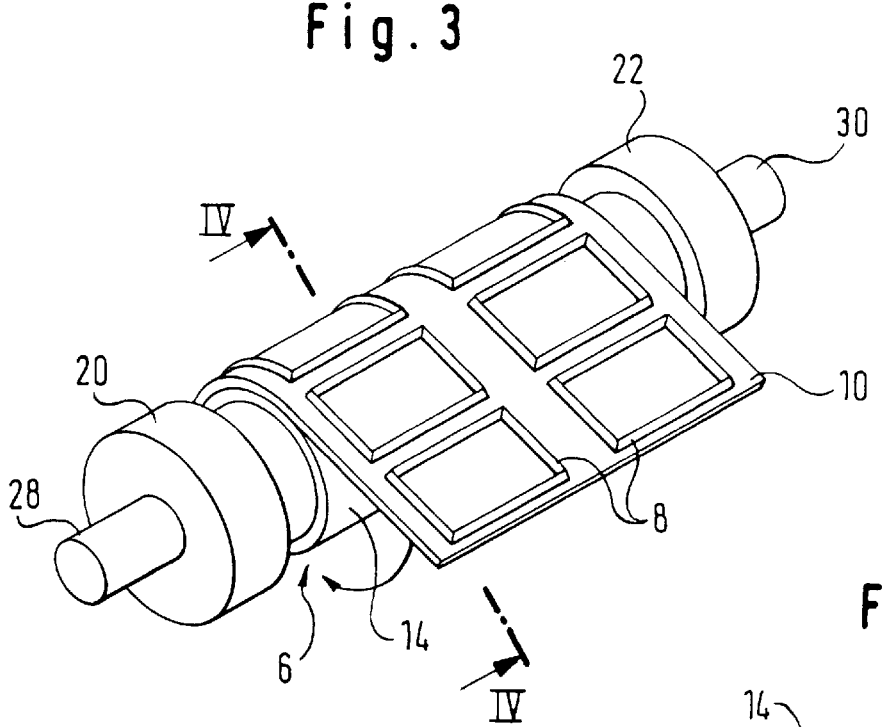
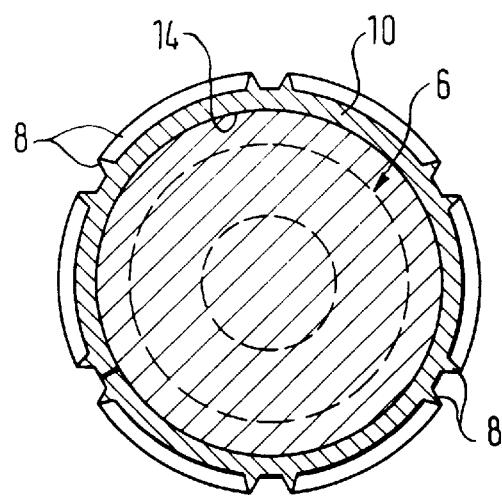
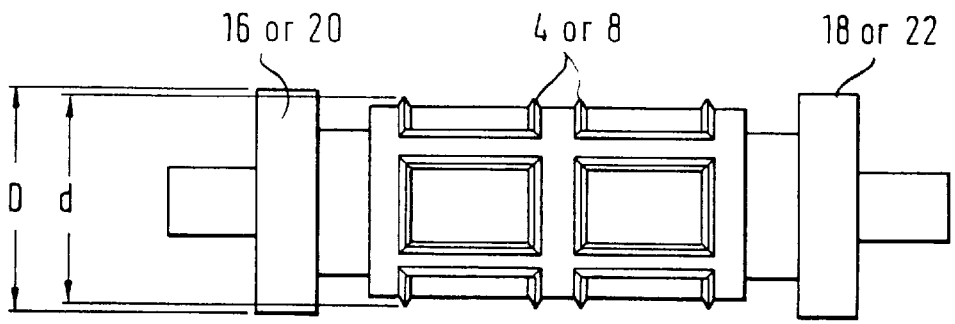

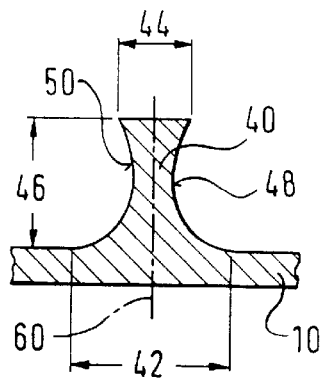
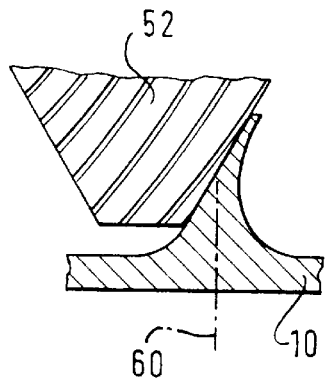
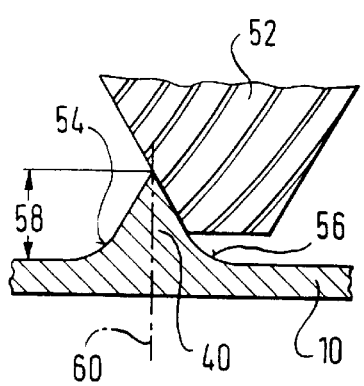
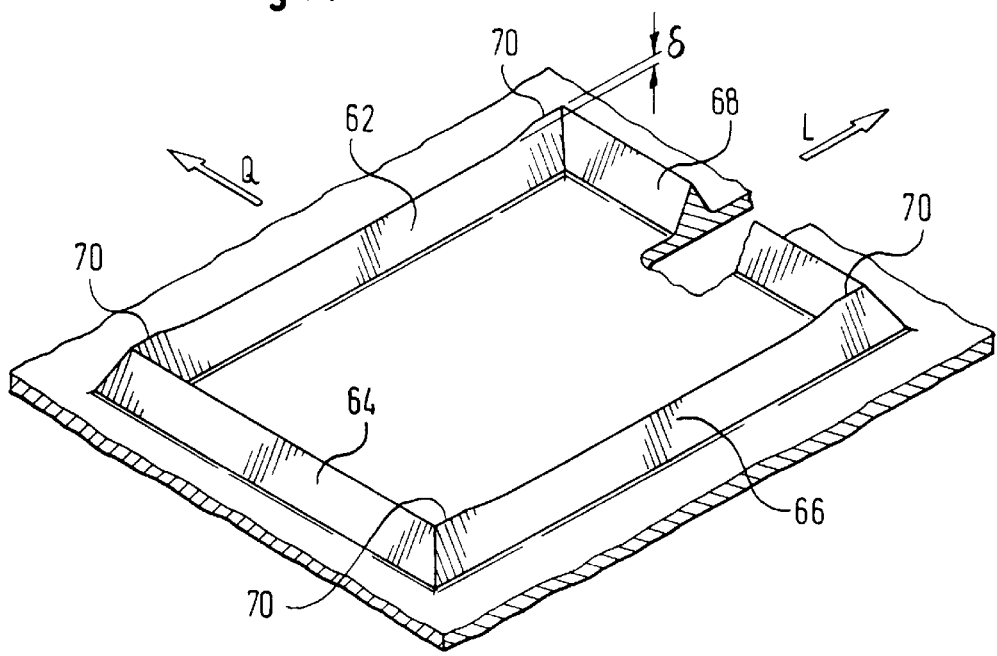

PROCESS FOR THE MACHINING OF STAMPING PARTS PHOTOCHEMICALLY ETCHED OUT OF A CARRIER BASE, AND STAMPING WEBS OBTAINED THEREFROM

This application is a division of application Ser. No. 08/261,128, filed Jun. 14, 1994 now abandoned.

BACKGROUND OF THE INVENTION

1. Field of the Invention

The invention relates to a process for the machining of label cutting edges which are etched photochemically out of a carrier base. The invention also relates to an apparatus for cutting labels. Labels consisting of label material adhering releasably to a supporting web are to be cut as a result of the rolling of the label cutting edges over the label material. The carrier base can be the body of a roller or a metal sheet fastened in the form of a sleeve on a roller.

2. Description of Related Art

It has been shown that cutting edges that have been formed only by photochemical etching are not suitable, without further treatment, for cutting out labels since they necessarily have relatively wide upper limiting faces (i.e., they are not sharp enough to cut through the label material).

SUMMARY OF THE INVENTION

One object of the invention is to provide a process for the production of label cutting (stamping) edges, which provides cutting edges having a long lifetime and accurate cutting properties.

Another object of the present invention is to provide a cutting edge having a long lifetime and accurate cutting properties.

In accomplishing the foregoing objectives, there has been provided according to the present invention a process for the production of cutting edges used to cut (stamp) labels out of a supporting web, said process comprising the steps of: selectively photochemically etching a carrier base to provide at least one cutting edge, so that said edge protrudes above said etched carrier base and has longitudinal sides; engaging said longitudinal sides with a frustoconical milling cutter; and rotating said cutter about its axis to mill said longitudinal sides to shape the cross section of said cutting edge into a triangular shape with fluted sides. The carrier base can be a roller which is preferably lathe-turned and at least superficially hardened. In an alternative embodiment, the carrier base is a flat metal sheet which can be attached and supported on a roller. Preferably, the roller which supports the sheet has been lathe-turned, and both the roller and the sheet have been at least superficially hardened.

The present invention also provides an apparatus for cutting (i.e., stamping or punching) labels out of a supporting web as the web passes the apparatus. The apparatus comprises a rotatable carrier base, at least one label cutting edge on said carrier base, said cutting edge having longitudinal sides and a triangular shaped cross section, wherein said triangular cross section has fluted sides with a base that is approximately 0.5 to 1.0 mm wide, and a height that is larger than the thickness of the labels. Preferably the height is approximately 0.4 to 1.0 mm. In a preferred embodiment, the carrier base is a roller or a metal sheet that can be fastened and supported in the form of a sleeve on a supporting roller. Preferably, the carrier base roller or supporting roller has a middle cylindrical portion on which the cutting edges are located, and end portions. The end portions have supporting portions thereon. The radius of said end and supporting portions is larger than the radius of the middle portion, which includes the cutting edges, by approximately the thickness of the supporting web.

The invention is described below by means of exemplary embodiments with reference to the accompanying drawings.

BRIEF DESCRIPTION OF THE DRAWINGS

FIG. 3 shows a second embodiment of a roller during the application and sleeve-shaped bending of a metal sheet provided with the label cutting edges.

FIG. 4 shows a section along IV—IV in FIG. 3.

FIG. 5 shows a side view of a finished cutting roller according to FIG. 1 or FIG. 3.

FIGS. 6a to 6d explain different machining steps of the cutting edges.

FIG. 7 shows a rectangularly closed cutting edge.

DETAILED DESCRIPTION OF THE PREFERRED EMBODIMENTS

The present invention comprises a process which gives the cutting edges a triangular cross-section with fluted sides. This process is achieved by milling the edges by means of a frustoconical milling cutter engaging the longitudinal sides of the cutting edges and rotating about its axis.

In order to obtain greater accuracy of the cutting edges, it is preferable that the milled cutting edges are finished by hand with a tool.

As already stated, the carrier base is preferably a roller or a metal sheet which is fastened in the form of a sleeve on a roller.

In order to hold the cutting edges at a predetermined distance from a cutting base during the cutting operation, so that the cutting edges cut through only the label material, but not its supporting web, it is preferred that the roller has a middle cylindrical surface portion, on which the cutting edges are located. On both ends of the cylindrical surface, at a distance from the middle portion, the roller has supporting portions having a radius larger than the radius of the middle portion, which includes the cutting edges, by approximately the thickness of the supporting web. Preferably, the radius of the ends is larger than the radius of the middle portion which includes the cutting edges by about 0.08 to 0.25 mm.

In a preferred embodiment, the lifetime of the roller or of the metal sheet and its cutting accuracy is increased if the roller is lathe-turned from a steel blank roller which, before lathe-turning, has been at least superficially hardened to approximately 35 to 45 HRC. Alternatively, the roller is lathe-turned from a steel blank roller which, after lathe-turning, is at least superficially hardened to approximately 35 to 65 HRC. In another aspect of the present invention, the metal sheet consists of steel which is at least superficially hardened to 45 to 55 HRC.

The present invention also comprises an apparatus for cutting out labels which has the following especially advantageous dimensions.

The width of the feet or base of the cutting edges is preferably 0.5 to 1.0 mm.

The height of the cutting edges is preferably somewhat larger than the thickness of the label material and is preferably 0.4 to 1.0 mm.

The width of the upper limiting faces of the cutting edges etched out photochemically, that is to say not yet machined by milling, is about 0.1 to 0.8 mm.

In another preferred embodiment, an especially long lifetime of the cutting edges is obtained if the height of the cutting edges extending in the rolling direction (direction L in FIG. 7), is lower, preferably by 0.007 to 0.011 mm, than the height of the cutting edges extending transversely relative to the rolling direction (direction Q in FIG. 7). An exception to this difference in height may be where the end portions of the extending in the rolling direction and transverse cutting edges intersect.

Figure 1:
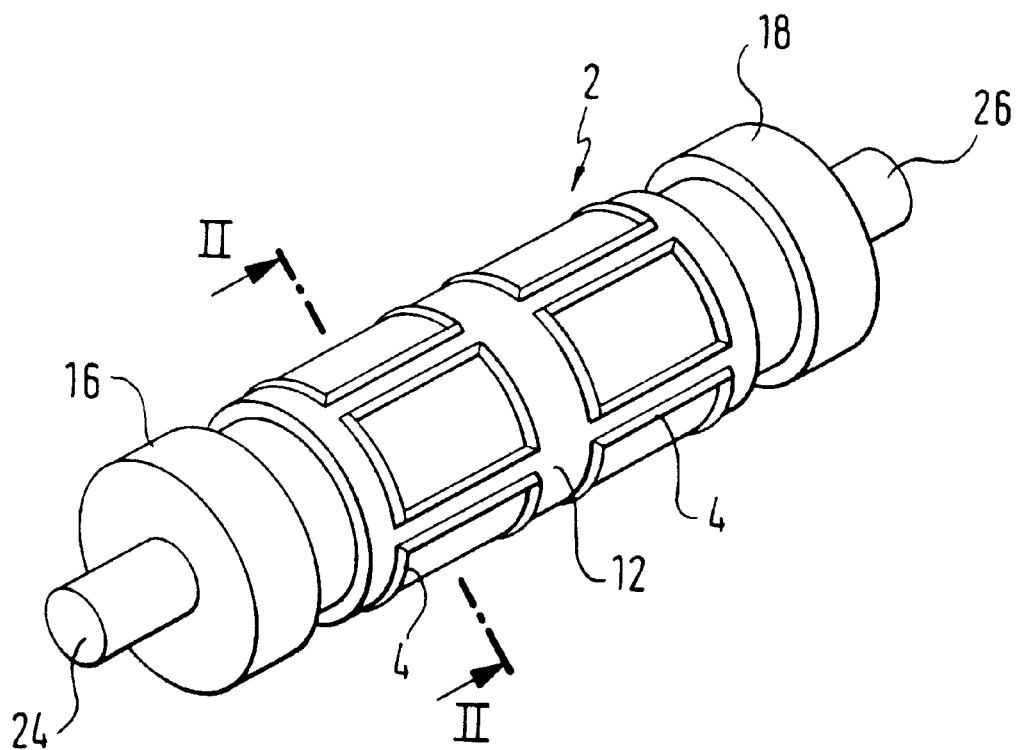
FIG. 1 shows a first embodiment of a cutting roller in the finished state.
Figure 2:
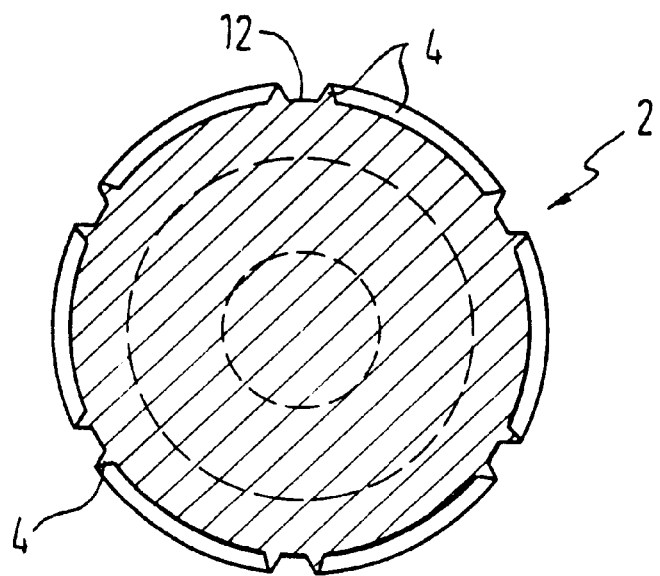
FIG. 2 shows a section along II—II in FIG. 1.

FIGS. 1 and 2 show a roller 2, from the body of which cutting edges 4 are etched out photochemically and are subsequently machined by milling.

In another embodiment, FIGS. 3 and 4 show a roller 6, around which a metal sheet 10, provided with cutting edges 8 etched out photochemically and subsequently milled, is shaped in the form of a sleeve. In both embodiments, the cutting edges 4 or 8 are located on a middle portion 12 or 14 of the roller 2 or 6. On both sides of the roller there are provided, at a distance from the middle portion, supporting portions 16, 18 or 20, 22, having a radius larger than the radius of the middle portion 12 or 14, which includes the cutting edges 4 or 8, by approximately the thickness of the supporting web of the label material, preferably 0.8 to 0.25 mm. The supporting portion radius is designated in FIG. 5 by D, and the middle portion radius in FIG. 5 is designated by d. Bearing journals 24, 26 or 28, 30 adjoin the supporting portions 16, 18 or 20, 22. The rollers 2 or 6 are lathe-turned from an cylindrical steel blank roller which has been at least superficially hardened to approximately 60 HRC.

FIG. 6a shows a cutting edge 40, obtained by photochemical etching. The width of its foot or base 42 is approximately 0.5 to 1.0 mm, the width of its upper limiting face 44 is approximately 0.1 to 0.8 mm, and its height 46 (etching depth) is approximately 0.4 to 1.0 mm. As is necessary in photoetching, its side faces 48, 50 are fluted, since during the photoetching, the upper limiting face is covered by an etch-resistant material (photoresist).

By means of a frustoconical milling cutter 52 rotating about its axis, both sides of the cutting edge etched out photochemically are then milled.

The cutting edge 40 thereby acquires a triangular cross-section which has fluted portions 54, 56 of the fluted side faces 48, 50. The fluted portions remain in the region of the edge's foot 42. The height 58 of the milled cutting edge 40 depends on how far the milling cutter 52 is moved in the direction of the center line 60 of the cutting edge 40. This movement can be programmed into the particular machine tool used. FIG. 6d shows a cutting edge 40 which has been milled.

FIG. 7 shows cutting edges 62, 64, 66, 68 closed to form a rectangle. The cutting edges 62, 66 extending in the rolling direction L (direction of rotation) of the rollers 2 or 6 are preferably 0.007 to 0.011 mm lower, over most of their length (with the exception of their end portions 70), than the height of the cutting edges 64, 68 extending transversely relative to the rolling direction Q. The height difference is designated by δ. These height differences can be accomplished by appropriate programming of the particular machine tools used. Although FIG. 7 shows the cutting edges closed, the present invention is not limited to closed cutting edges.

Figure 8:
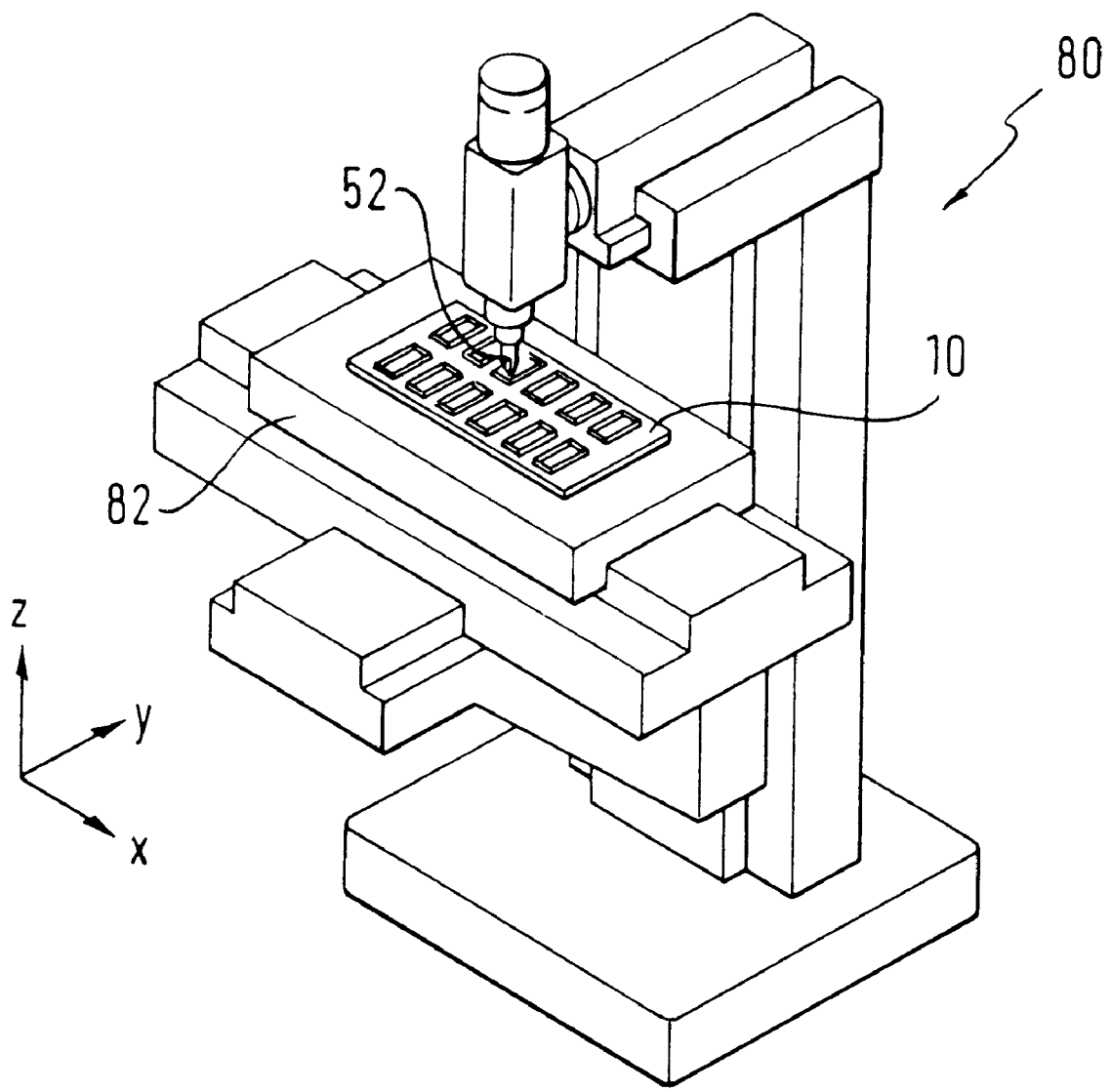
FIG. 8 shows a milling machine for the milling of a still plane metal sheet provided with cutting edges which have been etched out photochemically.

FIG. 8 shows diagrammatically a machine tool 80 with a slide 82 which can be moved relative to a milling cutter 52 up and down, to the left and right and forwards and backwards (coordinate direction x, y and z). The movement can be accomplished by computer control. Located on the slide is a still planar metal sheet 10, from which cutting edges have been photochemically etched and are now machined by means of the milling cutter 52 as described above.

Figure 9:
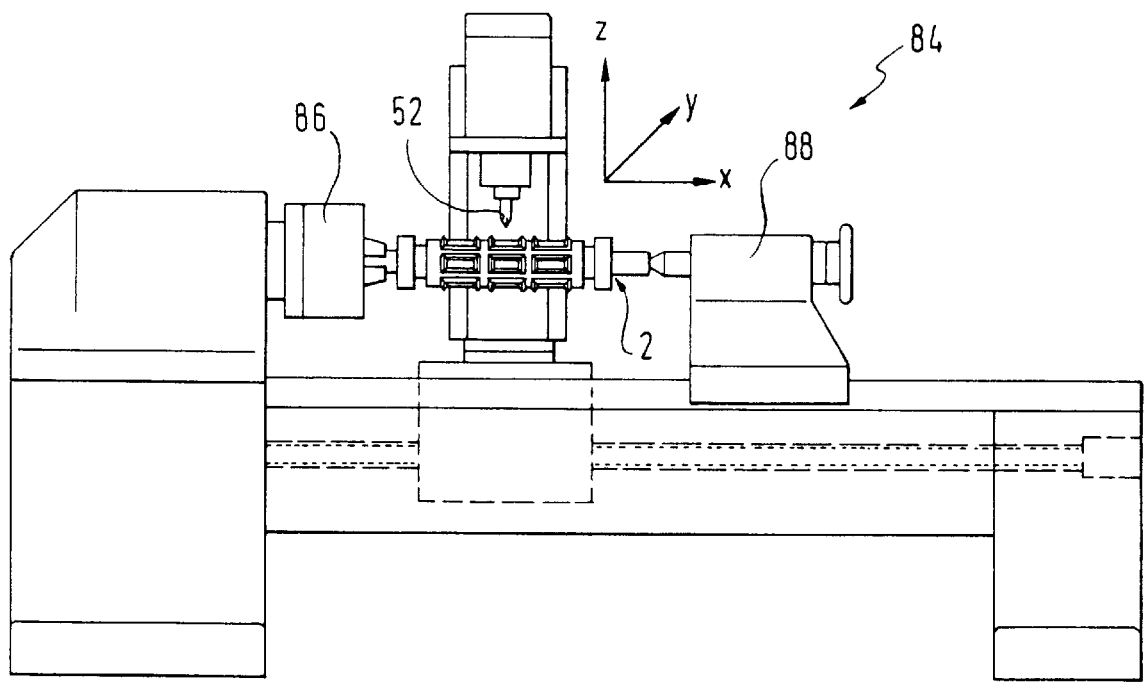
FIG. 9 shows a milling machine for the milling of cutting edges etched out photochemically from a cylindrical body or from a metal sheet bent around a cylindrical body.

In another embodiment, FIG. 9 shows a side view of a machine tool 84, in which a roller 2 is clamped between a working spindle 86 and a tailstock 88. In yet another embodiment, the roller can have a metal sheet wrapped around it. The working spindle 86 is rotated in a programmed manner during the milling. The milling cutter 52 is movable in a programmed manner up and down, to the left and right and forwards and backwards (coordinate directions x, y and z).

Figure 10:
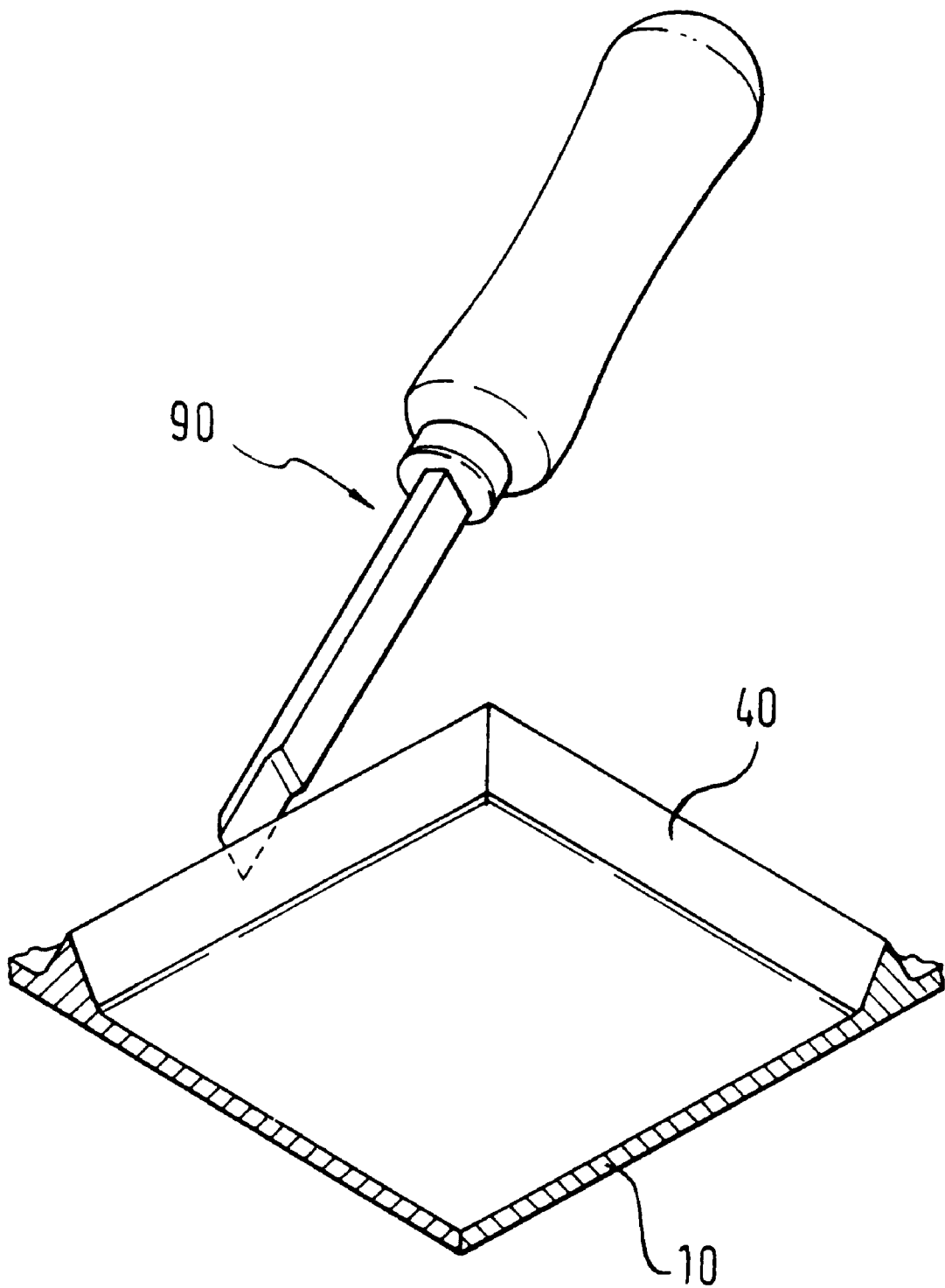
FIG. 10 shows diagrammatically a hand-machining of the cutting edges.

FIG. 10 shows a scraper 90, with which a milled cutting edge is finished by hand, if necessary.

What is claimed is:

1. An apparatus for stamping labels out of a label material on a supporting web as the web passes the apparatus, said apparatus comprises:

a rotatable carrier base which is a roller and at least one cutting edge with an apex-line extending in a longitudinal direction of the cutting edge, said cutting edge being provided on and integral with the material of said carrier base roller, said cutting edge having longitudinal sides parallel to the apex-line and a triangular shaped cross section, wherein said triangular cross section has fluted sides with a base that is approximately 0.5 to 1.0 mm wide, said carrier base roller further comprising flat etched areas adjacent the at least one cutting edge, wherein the material of the cutting edge and the carrier base roller are of a unitary construction.

2. An apparatus as claimed in claim 1, wherein the height of the edge above the adjacent etched area is approximately 0.4 to 1.0 mm.

3. An apparatus as claimed in claim 1, wherein the carrier base roller has a middle cylindrical portion on which the at least one cutting edge is located, and end portions, said end portions having supporting portions thereon; wherein the radius of said end and supporting portions is larger than the radius of the middle portion, which includes the at least one cutting edge, by approximately the thickness of the supporting web.

4. An apparatus as claimed in claim 3, wherein the radius of said end and supporting portions is larger than the radius of the middle portion, which includes the at least one cutting edge, by approximately 0.08 to 0.25 mm.

5. An apparatus as claimed 1, wherein the at least one cutting edge comprises multiple cutting edges, and wherein the height of said edges extending in the rotating direction is smaller than the height of said edges transverse to the rotating direction except where the extending in the rotating direction edges and transverse edges intersect.

6. An apparatus as claimed in claim 1, wherein said carrier base roller is lathe-turned and superficially hardened with a hardness in the range of approximately 35 to 45 HRC.

7. An apparatus as claimed in claim 1, wherein the cutting edge has a height that is larger than the thickness of the label material.

8. An apparatus as claimed in claim 5, wherein the height of said edges extending in the rotating direction is smaller than the height of said edges transverse to the rotating direction except where the extending in the rotating direction edges and transverse edges intersect.

* * * * *